United States Patent Office 3,471,581
Patented Oct. 7, 1969

3,471,581
ISOMERIZATION OF CYCLIC OLEFINIC
HYDROCARBONS
Perry L. Maxfield, Durango, Colo., assignor to Phillips
Petroleum Company, a corporation of Delaware
No Drawing. Filed Dec. 15, 1966, Ser. No. 601,856
Int. Cl. C07c 3/60, 5/24, 13/20
U.S. Cl. 260—666                                    10 Claims

ABSTRACT OF THE DISCLOSURE

Cyclooctadienes and alkenyl-substituted cyclohexenes are isomerized over a catalyst comprising a complex nickel compound having the formula (Z)Ni(L)X and a halide containing compound of aluminum, tin, zinc, boron or titanium.

---

This invention relates to the isomerization of certain olefinic hydrocarbons over nickel complex catalysts. In one aspect, it relates to the isomerization of certain cyclic olefinic hydrocarbons by contacting them with a nickel complex catalyst. In another aspect, it relates to the use of nickel complex catalysts for the isomerization of alkenyl-substituted cyclohexenes and alkyl-substituted or unsubstituted cyclooctadienes.

The conversion of olefinic hydrocarbons to other olefinic products is an operation which is recognized as being desirable in a number of situations. For example, the more plentiful material can be converted to a less plentiful and thereby more valuable material. The present invention described a convenient process for converting one olefinic hydrocarbon to another by isomerization.

It is therefore an object of this invention to convert one cyclic olefinic hydrocarbon to another by an isomerization process. It is a further object of this invention to convert alkenyl-substituted cyclohexenes and alkyl-substituted or unsubstituted cyclooctadienes to other olefinic products by an isomerization process. It is a further object of this invention to provide a new catalyst for certain isomerization reactions.

These and other objects will be apparent to one skilled in the art from the following disclosure and appended claims.

The isomerization process of my invention is conducted by contacting cyclic olefinic hydrocarbons as described below with a catalyst system comprising the reaction product resulting from the admixture of:

(a) A complex nickel compound having the formula (Z)Ni(L)X wherein Z is selected from:

(1) cyclopentadienyl,
  (2) alkyl substituted cyclopentadienyl having up to 3 alkyl groups, each alkyl group having up to 5 carbon atoms,
  (3) π-allyl,
  (4) π-methallyl,
  (5) π-crotyl,
  (6) nitrosyl, and
  (7) dialkyl dithiocarbamato wherein each alkyl group contains up to 5 carbon atoms;

L is selected from R′—S—R′, SR″, R′$_3$M, and (R′O)$_3$M wherein:

(1) M is selected from phosphorus, antimony, and arsenic, (2) each R′ is selected from aryl, alkyl, and cycloalkyl radicals and combinations of these, such as aralkyl and alkaryl, having up to 20 carbon atoms,
  (3) each R″ is selected from divalent saturated and olefinically unsaturated aliphatic radicals having 3 to 7 carbon atoms;

X is a halide; and (b) a compound selected from halides of aluminum, tin, zinc, boron and titanium, and the corresponding organohalides of these metals wherein at least one and less than all of the halogen atoms are replaced by an organic radical selected from R′ as defined above and alkoxy radicals having up to 12 carbon atoms.

The olefins suitable for use in the process of my invention are represented by the structural formulas:

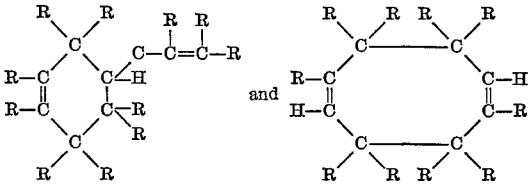

wherein R is a hydrogen or an alkyl radical having from 1 to 5 carbon atoms, and wherein fewer than 4 R groups are alkyl radicals.

Exemplary of compounds falling within the above specified genus are:

4-vinylcyclohexene
4-propenylcyclohexene
4-(1-methylenehexyl)cyclohexene
2,3,3-trimethyl-4-vinylcyclohexene
3,5,6-triamyl-4-vinylcyclohexene
1-methyl-4(1-ethylbutenyl)cyclohexene
5-isobutyl-4-vinylcyclohexene
1-methyl-2-ethyl-3-propyl-4-vinylcyclohexene
4-(1-methyl-2-butylheptenyl)cyclohexene
1,5-dimethyl-4-vinylcyclohexene
1,5-cyclooctadiene
3-methyl-1,5-cyclooctadiene
2,4-diethyl-4-amyl-1,5-cyclooctadiene
4-isopropyl-1,5-cyclooctadiene
3-(3-methylbutyl)-1,5-cyclooctadiene
3,4,8-triamyl-1,5-cyclooctadiene
2-ethyl-1,5-cyclooctadiene
3,8-dimethyl-1,5-cyclooctadiene Some examples of compounds falling within the generic formula of component (a) of the catalyst are:

Cyclopentadienyl(triphenylphosphine)bromonickel
π-Allyl(tributylarsenite)chloronickel
Diethyldithiocarbamato(thiophene)iodonickel
Nitrosyl(trimethylstibine)fluoronickel
Cyclopentadienyl(triphenylphosphite)chloronickel
π-Allyl(tripropylarsenite)bromonickel
Methylcyclopentadienyl(tribenzylarsenite)iodonickel
π-Allyl(tri-p-tolylphosphine)bromonickel
Dibutyldithiocarbamato(diamyl sulfide)chloronickel
Nitrosyl(trieicosylphosphite)chloronickel
Cyclopentadienyl(tricyclohexylphosphine)bromonickel Component (b) of the catalyst system is a halide of aluminum, tin, zinc, boron or titanium and includes these inorganic salts as well as the organo derivatives of such salts produced by replacement of some, but not all, of the halogen atoms with aromatic or aliphatic hydrocarbon radicals. Examples of some of the compounds falling within the generic group of component (b) are Aluminum chloride
Aluminum bromide
Zinc iodide
Stannic fluoride
Boron bromide
Titanium trichloride
Ethylaluminum dichloride
Diethylaluminum chloride
Methylzinc bromide
Phenylboron dichloride
Trioctyltin chloride
Dodecyltin tribromide
Dieicosylaluminum chloride
Dibenzylboron iodide
p-tolylzinc chloride
Diethoxyaluminum chloride Components (a) and (b) are generally combined, for use in this invention, in equimolar proportions. However, other molar proportions can be used within the range of about 3 to 1 to about 1 to 3. A slight excess of the second catalyst component is sometimes desirable to scavenge catalyst poisons which might be in the system.

The catalyst is prepared by combining the first and second catalyst components under conditions of time and temperature which permit the catalytically active reaction products to be formed. In general, the catalyst components can be combined at about 0° to about 130° C. within a few seconds or for up to about several hours in the presence of a diluent in which both of the components are at least partially soluble. Any convenient diluent such as chlorobenzene, methylene chloride, ethylene chloride, benzene, and the like can be used for this purpose. The mixing of the two catalyst components is generally carried out in an inert atmosphere and in the substantial absence of air or water. After the reaction product is formed, it need not be isolated but can be added directly into the reaction zone as a dispersion in its preparation solvent. If desired, the catalyst components can be separately added, in any order, to the reaction zone either in the presence or absence of the olefin.

The conversion of the olefin can take place at any convenient temperature within the broad range of −50 to about 100° C., preferably 0–50° C., and at any convenient pressure which is sufficient to maintain a liquid phase. The conversion can be carried out in the presence of a diluent such as that used for the catalyst preparation. The time of contact will depend upon the desired degree of conversion but will, generally, be in the range of a few minutes to about 20 hours. The proportion of catalyst composition to olefin in the reaction zone will generally be in the range of from about 0.001 to about 0.1 mol of nickel complex per mol of olefin.

Any conventional contacting technique will be utilized for the olefin conversion, and batchwise or continuous operation can be utilized. After the reaction period, the products can be separated and/or isolated by conventional means such as by fractionation, crystallization, adsorption, and the like. Unconverted feed material can be recycled.

The process of the present invention isomerizes the previously described cyclooctadienes and alkenyl-substituted cyclohexenes to olefinic products having the formulas:

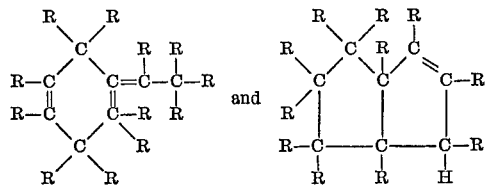

respectively, wherein R is as defined previously and wherein fewer than 4 R groups are alkyl radicals.

EXAMPLE I

A 0.10 g. quantity of cyclopentadienyl(triphenylphosphine)bromonickel was combined with 5 ml. chlorobenzene and 0.33 ml. ethylaluminum dichloride. To this yellow solution was added 10 ml. 4-vinylcyclohexene. The mixture was allowed to stand at room temperature for 1 hour and 20 minutes under a nitrogen atmosphere in a sealed pressure bottle. The contents of the bottle were then sampled, and the bottle was placed in a 50° C. bath for another 30 minutes.

Gas-liquid chromatographic analysis showed that, after the 1 hour and 20 minute room temperature reaction period, 43 percent of the 4-vinylcyclohene was converted with a 100 percent selectivity to 4-ethylidenecyclohexene. After the 50° C. heating period, the reaction mixture analysis showed that 76 percent of the 4-vinylcyclohexene was converted and that 4-ethylidenecyclohexene was produced with a selectivity of 62 percent. Some polymeric products were also obtained.

EXAMPLE II

A 0.10 g. quantity of cyclopentadienyl(triphenylphosphine)bromonickel was combined with 5 ml. dry chlorobenzene and 0.33 ml. ethylaluminum dichloride in a reaction vessel which had been purged of air with nitrogen. To this was added 10 ml. (about 8 g.) of 1,5-cyclooctadiene, and the mixture was stirred for 45 minutes at room temperature.

Analysis of the reaction mixture by gas-liquid chromatography showed that, during the 45-minute reaction period at room temperature, 46 percent of the 1,5-cyclooctadiene was converted with 80 percent selectivity to bicyclo-[3.3.0]oct-2-ene.

EXAMPLE III

The conversion of 1,5-cyclooctadiene was carried out using π-allyl-(triphenylarsine)bromonickel as the catalyst.

A 0.1 g. quantity of NiBr$_2$ (anhydrous), 0.15 g. triphenylarsine and 0.1 ml. tetrallyltin were combined with 2 ml. of dry tetrahydrofuran and stirred at 50° C. The solvent was then removed under reduced pressure.

To the above-prepared composite was added 10 ml. of methylene chloride, 0.7 ml. of ethylaluminum dichloride, the mixture being cooled in an ice bath. After a few minutes, 15 ml. 1,5-cyclooctadiene was added, and the ice bath cooling was continued for about 35 minutes. The contents of the reaction vessel were then stirred for another 25 minutes at room temperature.

The analysis of the reaction mixture showed that the 1,5-cyclooctadiene conversion was 68 percent and that bicyclo[3.3.0]oct-2-ene was prepared with a 55 percent selectivity.

I claim:
1. A process of isomerization comprising contacting an olefin selected from:

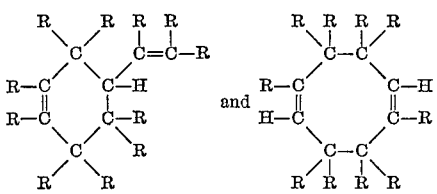

wherein each R is selected from hydrogen and alkyl radicals having 1 to 5 carbon atoms and wherein fewer than 4 R groups in the molecule are alkyl with a catalyst comprising:

(a) a complex nickel compound having the formula (Z)Ni(L)X wherein Z is selected from
 (1) cyclopentadienyl, (2) alkyl substituted cyclopentadienyl having up to three alkyl groups, each alkyl group having up to 5 carbon atoms,
(3) π-allyl,
(4) π-methallyl, and
(5) π-crotyl, L is R′₃M, wherein (1) M is selected from phosphorus, antimony, and arsenic, and
(2) each R′ is aryl having up to 20 carbon atoms;

X is a halide;

(b) a compound selected from organo aluminum halides wherein the organo group is an alkyl having up to 20 carbon atoms to produce (c) olefinic products having the formulas

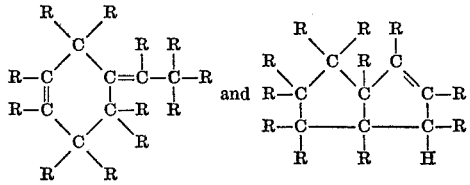

from alkenyl-substituted cyclohexenes and cyclooctadienes as defined, respectively, and wherein the R is as defined previously and wherein fewer than 4 R groups are alkyl radicals.

2. A process according to claim 1 wherein said olefin is selected from 4-vinylcyclohexene and 1,5-cyclooctadiene, said organo aluminum halide is an organo aluminum chloride and said products are 4-ethylidenecyclohexene and bicyclo[3.3.0]oct-2-ene.

3. Process of claim 1 wherein the molar ratio of (a) to (b) is from about 3:1 to about 1:3.

4. Process of claim 3 wherein from about 0.001 mol to about 0.1 mol of nickel complex is present per mol of olefin.

5. Process of claim 1 wherein said contacting occurs at a temperature between about —50° C. and 100° C.

6. Process of claim 1 wherein said contacting occurs in a diluent medium selected from chlorobenzene, methylene chloride, ethylene chloride and benzene.

7. Process of claim 1 wherein said catalyst is formed by mixing (a) and (b) in a diluent medium and said olefin is contacted with the resultant dispersion.

8. Process of claim 1 wherein 4-vinylcyclohexene is contacted with a catalyst comprising cyclopentadienyl (triphenylphosphine)bromonickel and ethylaluminum dichloride in chlorobenzene for about 80 minutes at room temperature and about 30 minutes at about 50° C. 4-ethylidenecyclohexene.

9. Process of claim 1 wherein 1,5-cyclooctadiene is contacted with a catalyst comprising cyclopentadienyl (triphenylphosphine)bromonickel and ethylaluminum dichloride in chlorobenzene for about 45 minutes at room temperature to produce bicyclo[3.3.0]oct-2-ene.

10. Process of claim 1 wherein 1,5-cyclooctadiene is contacted with a catalyst comprising π-allyl(triphenylarsine)bromonickel and ethylaluminum dichloride in methylene chloride for about 35 minutes at about 0° C. and about 25 minutes at room temperature to produce bicyclo[3.3.0]oct-2-ene.

References Cited

UNITED STATES PATENTS

| | | |
|---|---|---|
| 3,238,265 | 3/1966 | Mueller. |
| 3,219,716 | 11/1965 | Wittenberg. |
| 3,375,287 | 3/1968 | Tinsley. |
| 3,363,016 | 1/1968 | Stapp. |
| 3,294,854 | 12/1966 | Slaugh. |
| 3,250,818 | 5/1966 | Cannell. |
| 3,379,706 | 4/1968 | Wilke. |
| 3,320,327 | 5/1967 | Stapp. |
| 3,361,837 | 1/1968 | Stapp. |
| 3,309,410 | 3/1967 | Schriegheim. |

OTHER REFERENCES

Paul R. Stapp et al., J. Org. Chem. 30 (9), 3006–9, 1965.

DELBERT E. GANTZ, Primary Examiner

V. O'KEEFE, Assistant Examiner